United States Patent
Kim et al.

(10) Patent No.: US 7,768,231 B2
(45) Date of Patent: Aug. 3, 2010

(54) BATTERY PACK

(75) Inventors: Tae il Kim, Gwangmyeong-si (KR);
Soonkwang Jung, Seoul (KR)

(73) Assignee: LG Chem, Ltd. (KR)

( * ) Notice: Subject to any disclaimer, the term of this patent is extended or adjusted under 35 U.S.C. 154(b) by 251 days.

(21) Appl. No.: 11/522,661

(22) Filed: Sep. 18, 2006

(65) Prior Publication Data

US 2008/0079394 A1 Apr. 3, 2008

(51) Int. Cl.
*H02J 7/00* (2006.01)

(52) U.S. Cl. .................. 320/112; 320/114; 429/162

(58) Field of Classification Search .......... 320/112–114
See application file for complete search history.

(56) References Cited

U.S. PATENT DOCUMENTS 5,302,110 A * 4/1994 Desai et al. .................. 429/96
6,492,058 B1 * 12/2002 Watanabe et al. ............ 429/121
6,614,100 B1 * 9/2003 Hauser et al. ................ 257/666
6,824,919 B2 * 11/2004 Law et al. .................... 429/176
2004/0029000 A1 * 2/2004 Morita et al. ................ 429/162

* cited by examiner

*Primary Examiner*—Edward Tso
*Assistant Examiner*—Samuel Berhanu
(74) *Attorney, Agent, or Firm*—Cantor Colburn LLP (57) ABSTRACT

Disclosed herein is a battery pack wherein ultrasonic welding is performed at side walls extending from an upper case and a lower case, each of the side walls having a predetermined thickness, and a film-shaped label is formed at the upper surface and/or the lower surface of the case, whereby the coupling force due to the ultrasonic welding is very large although the thickness is very small, the structural stability against being dropped or external impacts is high, and interface area of the coupling regions is large, with the result that the attachment of any label for increasing the coupling force and preventing the introduction of foreign matters is not necessary.

9 Claims, 10 Drawing Sheets

FIG. 1

*Prior Art*

FIG. 2

*Prior Art*

FIG. 3

Prior Art

FIG. 4

*Prior Art*

FIG. 5

*Prior Art*

FIG. 6

Prior Art

FIG. 7

Prior Art

FIG. 8

*Prior Art*

FIG. 9

*Prior Art*

FIG. 10

*Prior Art*

FIG. 11

Prior Art

BATTERY PACK

FIELD OF THE INVENTION

The present invention relates to a battery pack having an improved structure, and, more particularly, to a battery pack wherein ultrasonic welding is performed at side walls extending from an upper case and a lower case, each of the side walls having a predetermined thickness, and a film-shaped label is formed at the upper surface and/or the lower surface of the case, whereby the coupling force due to the ultrasonic welding is very large although the thickness is very small, the structural stability against being dropped or external impacts is high, and interface area of the coupling regions is large, with the result that the attachment of any label for increasing the coupling force and preventing the introduction of foreign matters is not necessary.

BACKGROUND OF THE INVENTION

As mobile devices have been increasingly developed, and the demand of such mobile devices has increased, the demand of secondary batteries has been also sharply increased as an energy source for the mobile devices. One of the secondary batteries is a lithium secondary battery having high energy density and discharge voltage, on which much research has been carried out and which is now commercially and widely used.

Based on its external shape, the lithium secondary battery is generally classified as a cylindrical battery, a rectangular battery, or a pouch-shaped battery. Based on its electrolyte, the lithium secondary battery is classified as a lithium-ion battery or a lithium-ion polymer battery. As the mobile devices have been miniaturized, the demand of the rectangular battery and the pouch-shaped battery, which have a relatively small thickness, has increased.

Figure 1:
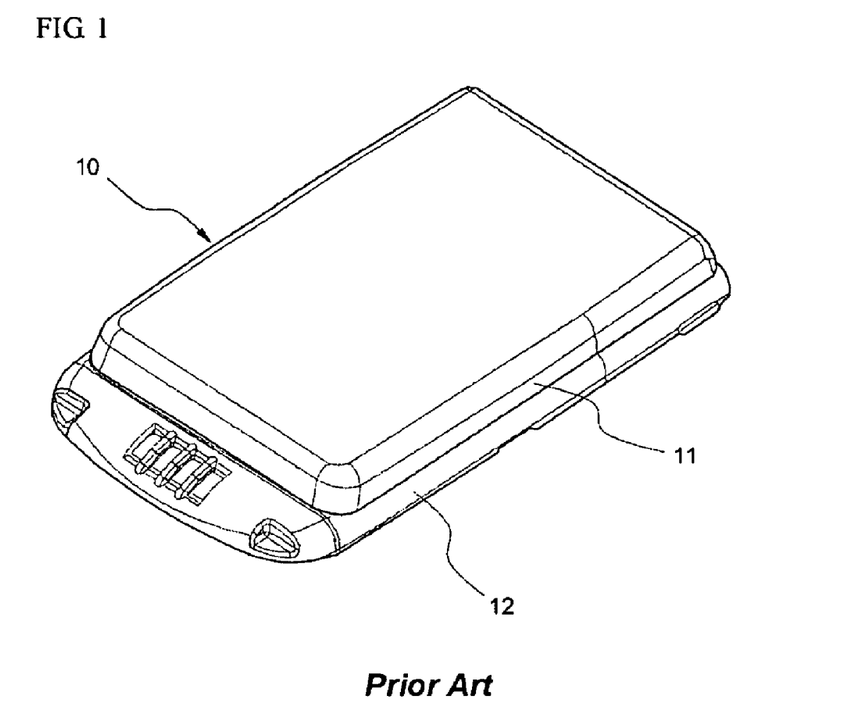
FIG. 1 is a perspective view illustrating a hard battery pack.

Furthermore, based on how the secondary battery is mounted to a case, a battery pack is generally classified as a hard battery pack or an inner battery pack. A typical example of the hard battery pack is shown in FIG. 1. Referring to FIG. 1, the hard battery pack 10 forms a part of the external appearance of an external device 12, to which the hard battery pack 10 is mounted. Consequently, the hard battery pack 10 has an advantage in that the hard battery pack can be easily mounted to the external device 12 when in use. However, it is required to design a case (housing) 11 based on kinds of external devices while a battery cell (not shown) is mounted in the case. As a result, the manufacturing costs of the hard battery pack 10 are high, and, furthermore, the hard battery pack 10 has low compatibility with the external devices.

Figure 2:
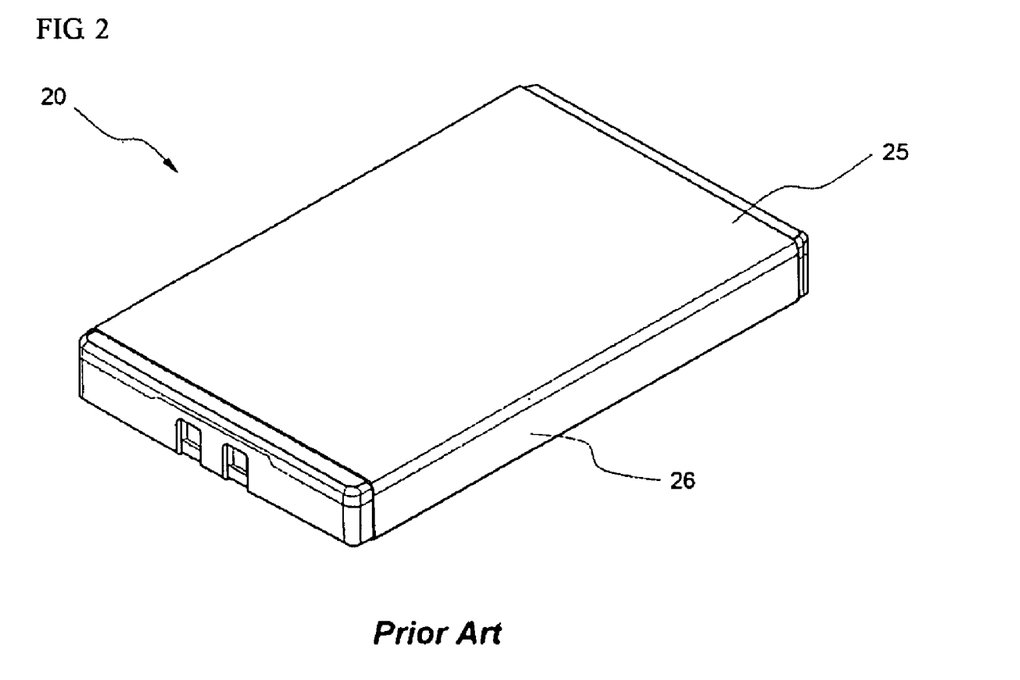
FIG. 2 is a perspective view illustrating a conventional inner battery pack including a rectangular battery cell.

On the other hand, as shown in FIG. 2, the inner battery pack 20 is mounted in an external device, and is then hidden by a cover, which forms a part of the external device. As a result, although it is relatively troublesome to mount the inner battery pack 20 in the external device, the inner battery pack 20 has advantages in that it is easy to design the inner battery pack, the manufacturing costs of the inner battery pack are low, and the inner battery pack has high compatibility with the external devices.

The details of an inner battery pack including a rectangular battery cell will be described with reference to FIGS. 3 and 4. Referring to these drawings, the inner battery pack 20 comprises: a rectangular battery cell 21 having a cathode terminal formed at one side thereof and an anode terminal formed at the other side thereof; a positive temperature coefficient (PTC) element 22 connected to one of the two electrode terminals of the battery cell 21 for primarily protecting the battery from overcurrent, overdischarge, and overcharge; a protection circuit unit 24 connected to the PTC element 22 side electrode terminal (the cathode terminal or the anode terminal) through a nickel plate 23 and connected to the other electrode terminal through a nickel plate 27 for secondarily protecting the battery, the protection circuit unit 24 being provided at the outside thereof with external input and output terminals, through which the protection circuit unit 24 is connected to corresponding external devices (not shown); an upper case 25 and a lower case 26 for surrounding the battery cell 21, the PTC element 22, and the protection circuit unit 24.

Between the side of the battery cell 21 and the nickel plate 23 and between the protection circuit unit 24 and the nickel plate 27 are disposed insulation sheets 28, which prevent short circuits due to unnecessary contact between the nickel plates 23 and the battery cell 21 or between the nickel plates 27 and the protection circuit unit 24.

Also, a double-sided adhesive tape 29 is disposed between the battery cell 21 and the lower case 26 such that the battery case 21 can be tightly fixed to the bottom of the lower case 26 by means of the double-sided adhesive tape 29. Consequently, when the battery cell 21 is received in the upper and lower cases 25 and 26, the battery cell 21 can be stably fixed in the upper and lower cases 25 and 26.

After the upper case 25 is coupled to the lower case 26, in which the battery cell 21 is received, the coupled upper and lower cases 25 and 26 may be surrounded by a packing label 30, which further increases the coupling force between the upper and lower cases 25 and 26 and prevents external foreign matters from being introduced into the coupling regions between the upper and lower cases or into the upper and lower cases.

Figure 5:
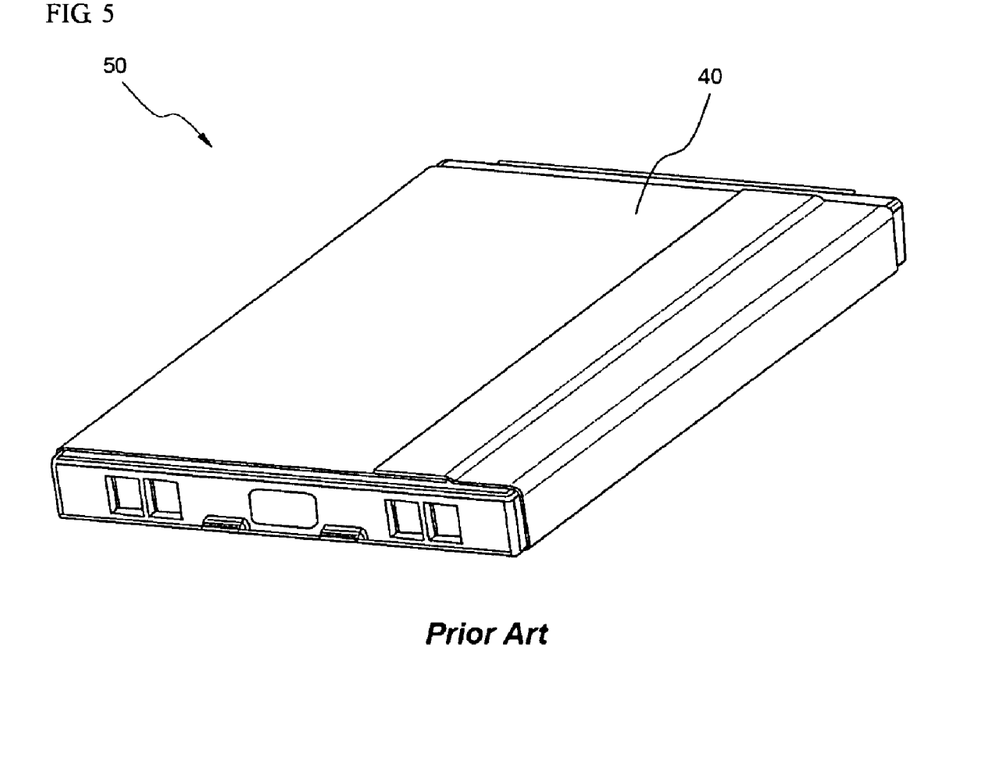
FIG. 5 is a perspective view illustrating a conventional inner battery pack including a pouch-shaped battery cell.
Figure 6:
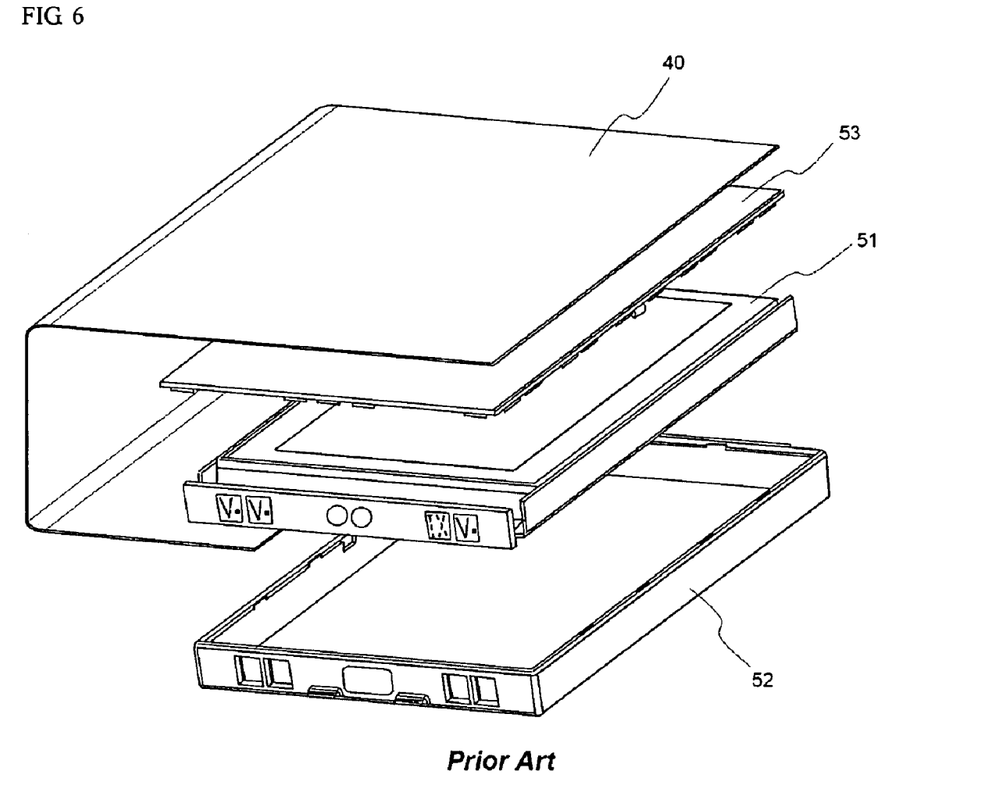
FIG. 6 is an exploded perspective view of the battery pack shown in FIG. 5.
Figure 7:
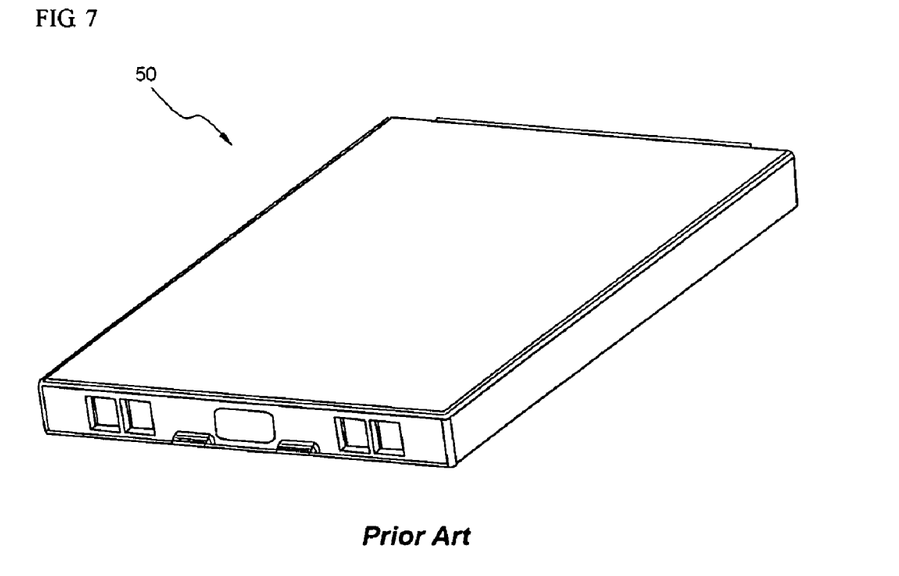
FIG. 7 is a perspective view of the battery pack shown in FIG. 5, which is partially assembled.

FIG. 5 is a perspective view illustrating a conventional inner battery pack including a pouch-shaped battery cell, FIG. 6 is an exploded perspective view of the battery pack shown in FIG. 5, and FIG. 7 is a perspective view of the battery pack shown in FIG. 5, which is partially assembled.

Referring to these drawings, the battery pack 50 includes a pouch-shaped battery cell 51 having an electrode assembly, which consists of cathodes, anodes, and separators, mounted therein together with an electrolyte in a sealed state, a lower case 52 having an inner space for receiving the battery pack 51, and an upper case 53 coupled to the lower case 52, in which the battery cell 51 is received, for sealing the battery cell 51. Also, double-sided adhesive tapes 54 are disposed between the battery cell 51 and the upper and lower cases 53 and 52 such that the battery cell 51 can be stably fixed in the inner space defined by the cases 52 and 53.

Figure 3:
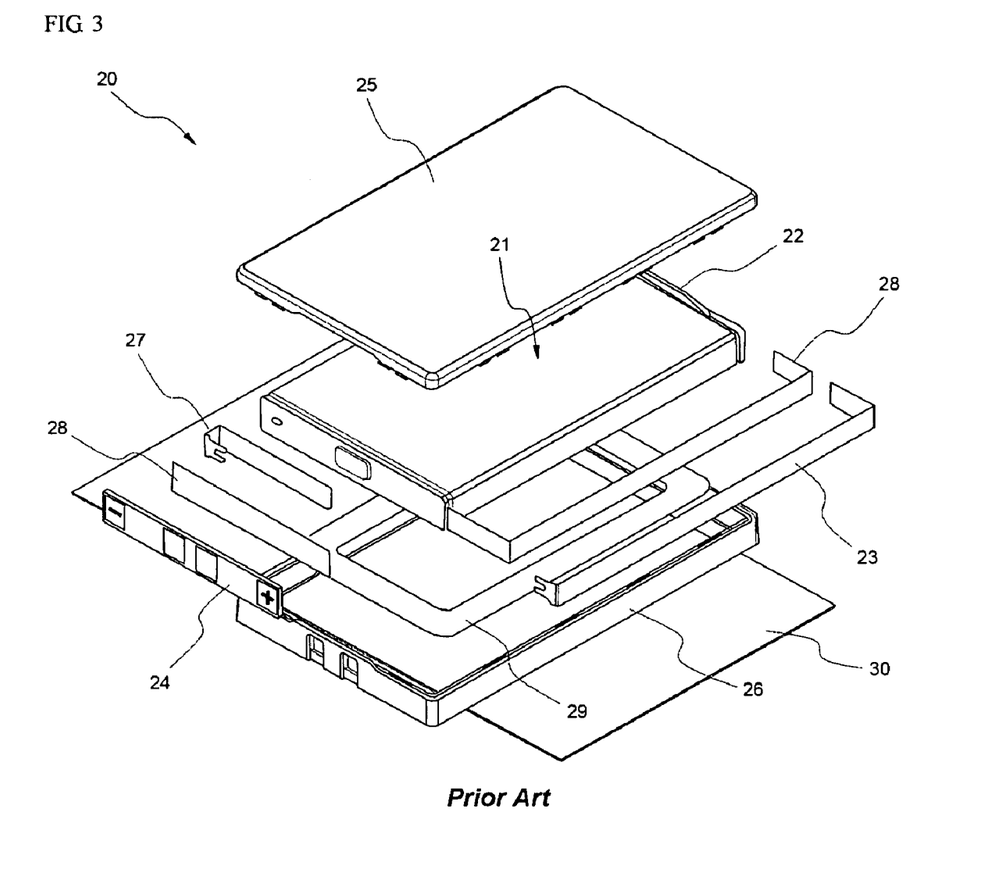
FIG. 3 is an exploded perspective view of the battery pack shown in FIG. 2.
Figure 4:
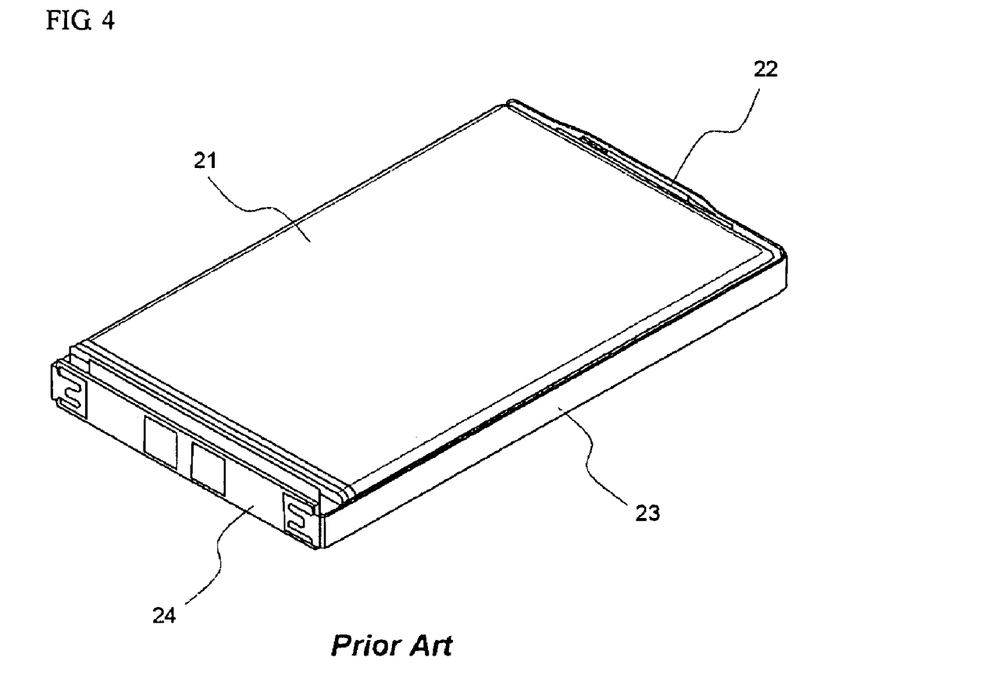
FIG. 4 is a perspective view of the battery pack shown in FIG. 2, which is partially assembled.

After the upper case 53 is coupled to the lower case 52, in which the battery cell 51 is received, the coupled upper and lower cases 53 and 52 are surrounded by a packing label 40, in the same manner as the assembly process of the battery pack 20 shown in FIGS. 2 to 4, such that the coupling force between the upper and lower cases 53 and 52 is increased, and external foreign matters are prevented from being introduced into the coupling regions between the upper and lower cases or into the upper and lower cases.

In the battery pack 20 of FIG. 2 and the battery pack 50 of FIG. 5, the upper and lower cases are made of a plastic material, such as polycarbonate (PC) or polyacrylonitrile-butadiene-styrene (ABS), and the upper and lower cases are securely coupled to each other by an ultrasonic welding method. The ultrasonic welding method is a method of welding two surfaces to be attached using frictional heat generated by vibrations of high frequency, for example, 20,000 Hz.

Figure 8:
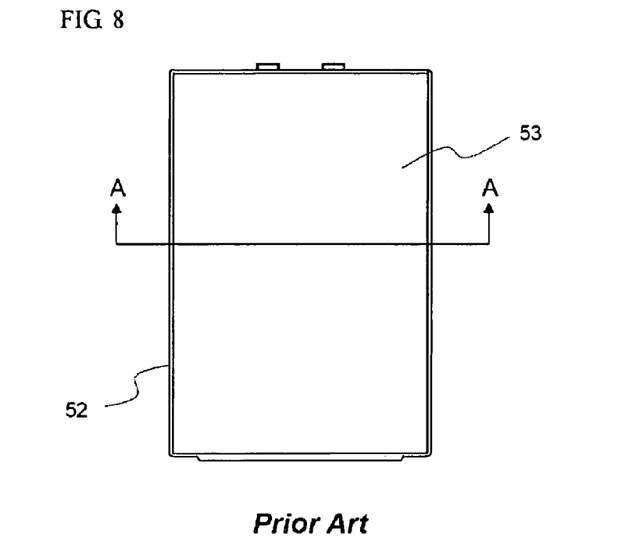
FIG. 8 is a plan view illustrating a conventional battery pack.
Figure 9:
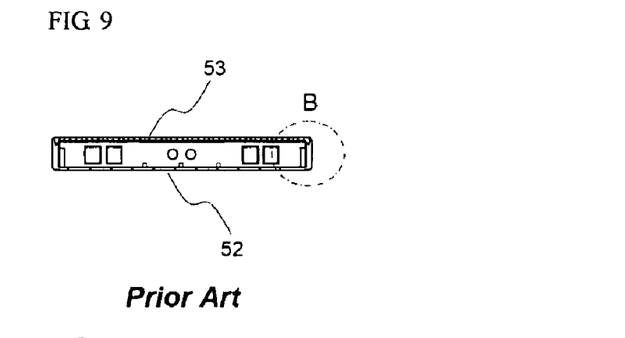
FIG. 9 is a sectional view taken along line A-A of FIG. 8.
Figure 10:
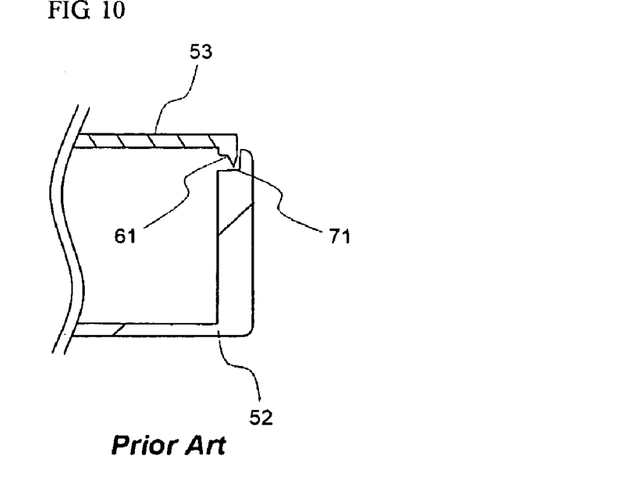
FIG. 10 is a partially enlarged view illustrating the part B of FIG. 9 before ultrasonic welding.
Figure 11:
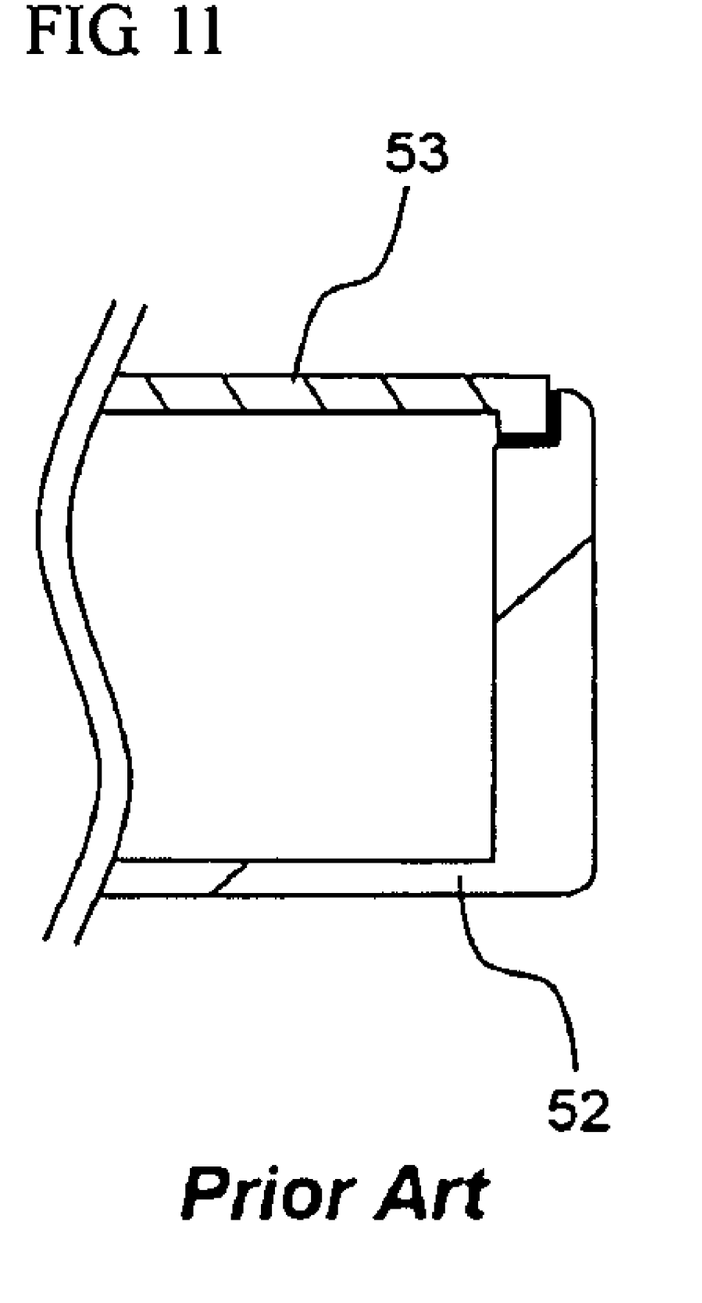
FIG. 11 is a partially enlarged view illustrating the part B of FIG. 9 after ultrasonic welding.

The details of the coupling between the lower case and the upper case by the ultrasonic welding method will be described with reference to FIGS. 8 to 11. FIG. 8 is a plan view illustrating the upper case 53 mounted on the lower case 52, and FIG. 9 is a vertical sectional view (a sectional view taken along line A-A of FIG. 8) of the coupled the upper and lower cases 53 and 52. While the upper case 53 is mounted on the lower case 52, opposite ends of the upper case 53 are in contact with opposite ends of the lower case 52. FIG. 10 is a partially enlarged view illustrating the contact part B of FIG. 9 before ultrasonic welding, and FIG. 11 is a partially enlarged view illustrating the contact part B of FIG. 9 after ultrasonic welding. As shown in FIG. 10, a wedge-shaped welding ridge 61 is formed at the end of the upper case 53, and a welding surface 71 is formed at the end of the lower case 52 such that the welding surface 71 can be brought into contact with the welding ridge 61. When high-frequency vibrations are applied to the welding ridge 61 and the welding surface 71, the contact surface between the welding ridge 61 and the welding surface 71 is welded, and therefore, the welding ridge 61 and the welding surface 71 are attached to each other.

However, as the demand of small-sized battery packs having further decreased thicknesses has increased, the thicknesses of the lower case 52 and the upper case 53 have been reduced down to 0.3 to 0.35 mm in recent years. As a result, it is difficult to manufacture the lower case and the upper case by die casting and injection molding. Furthermore, as the sizes of the welding ridge 61 and the welding surface 71 are decreased, the welding strength is reduced, and therefore, poor welding rate is increased.

Also, when the upper case having a small thickness and the lower case having a small thickness are welded to each other by the ultrasonic welding, the coupling force between the upper case and the lower case is relatively small. Consequently, it is required that a film-shaped wrapping label be applied to the outer surface of the battery pack so as to secure a coupling force necessary to be used as the battery pack and to prevent foreign matters from being introduced into the coupling regions between the upper and lower cases or into the upper and lower cases.

For this reason, a battery pack that has an adequate strength against the external impacts even using small-thickness cases and that can be easily manufactured with reduced manufacturing costs is highly required.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, when ultrasonic welding is performed at side walls extending from an upper case and a lower case, each of the side walls having a predetermined thickness, and a film-shaped label is formed at the upper surface and/or the lower surface of the case, the coupling force due to the ultrasonic welding is increased although the thickness is very small, the structural stability against being dropped or external impacts is increased, and interface area of the coupling regions is increased, whereby the attachment of any label for increasing the coupling force and preventing the introduction of foreign matters is not necessary. The present invention has been completed based on the above-mentioned discovery.

In accordance with the present invention, the above and other objects can be accomplished by the provision of a battery pack comprising: a rectangular battery cell having an electrode assembly, which consists of cathodes, anodes, and separators, mounted therein together with an electrolyte in a sealed state; a lower case having an inner space for receiving the battery cell; and an upper case coupled to the lower case, in which the battery cell is received, for sealing the battery cell, wherein the upper and lower cases are provided with side walls, each of which has a predetermined thickness, by which coupling regions of the upper and lower cases are located at the sides of the battery cell, and a film-shaped label is formed on at least one surface, which is selected from the upper surface of the upper case and the lower surface of the lower case.

According to the present invention, it is possible to secure an appropriate thickness sufficient to perform the ultrasonic welding at the upper case and the lower case without increasing the thickness of the battery pack. As a result, the coupling force is increased, and the interface area of the coupling regions is increased. Consequently, the attachment of any label for increasing the coupling force and preventing the introduction of foreign matters is not necessary, and therefore, the manufacturing process of the battery pack is simplified.

In the conventional battery pack, as shown in FIGS. 2 to 7, the plate-shaped upper case is coupled to the box-shaped lower case, the upper part of which is open, and therefore, the coupling regions of the upper case and the lower case are positions corresponding to the corners of the battery cell. Consequently, the coupling regions between the cases are limited to the end of the small-thickness upper case with the result that it is limited to secure an appropriate thickness.

According to the present invention, on the other hand, the side walls are formed at the upper case and the lower case, respectively, and the side walls of the upper case and the lower case are coupled to each other. Consequently, the coupling regions between the cases are located at the sides of the battery cell. Since the coupling regions between the cases are located at the sides of the battery cell, the total thickness of the battery pack is not increased, and it is possible to adjust the thickness of the side walls to a thickness appropriate for ultrasonic welding. The "predetermined thickness" means a thickness appropriate for ultrasonic welding, which is not particularly restricted. Furthermore, this predetermined thickness increases the interface area of the coupling regions, and therefore, the attachment of any wrapping label for preventing foreign matters from being introduced to the coupling regions is not necessary.

In a preferred embodiment, the side walls of the upper case has length and thickness approximately equal to those of the side walls of the lower case, whereby the lower case and the upper case is constructed generally in a symmetrical structure. In this case, the coupling regions of the upper case and the lower case are located approximately at the center parts of the sides of the battery cell, and therefore, it is possible to secure a thickness that is the most appropriate for the ultrasonic welding.

In another preferred embodiment, the battery pack further comprises: shoulders, at which the upper surface and the side walls of the upper case meet each other, the shoulders being gently bent in the sectional shape of a curve. This gently-bent curve structure is a wide arch-shaped structure, which is relatively stable when external impacts are applied to the upper corners. This gently-bent curve structure is also applied to the lower case in the same manner.

The material for the upper case and the lower case is not particularly restricted. At least the side wall regions, at which the ultrasonic welding is performed, are made of a plastic material, such as polycarbonate (PC) or polyacrylonitrile-butadiene-styrene (ABS). Consequently, the entire cases, including the side walls, may be made of a plastic material or a composite material including plastic and metal.

When the battery pack is dropped or external impacts are applied to the battery pack, the external force is concentrated to the coupling regions between the upper and lower cases, and therefore, the coupling regions between the upper and lower cases are broken. The upper surface of the battery pack (the upper surface of the upper case of the battery pack) and the lower surface of the battery pack (the lower surface of the lower case of the battery pack) are not affected so long as a vertical external force is not applied to the upper surface of the battery pack or the lower surface of the battery pack, and the possibility of applying such vertical external force to the upper surface of the battery pack or the lower surface of the battery pack is relatively low in consideration of general effects of the external force to the battery pack. Consequently, even in the case of the conventional battery pack as shown in FIGS. 2 to 7, the protection of the battery pack against the external force vertically applied to the upper surface and lower surface of the battery pack is not guaranteed. In consideration of this fact and the fact that the demand of thin battery packs has been increased, it is preferable to manufacture the upper surface of the upper case and the lower surface of the lower case with a relatively small thickness. However, the conventional battery pack has a specific limit in consideration of the limit in the injection molding, and, furthermore, the formation of the welding ridge for the ultrasonic welding.

According to the present invention, on the other hand, the ultrasonic welding is performed at the side walls extending downward from the upper case, whereby the latter of the problems caused in the conventional art is solved. Furthermore, according to the present invention, the battery pack is constructed in a structure in which the film-shaped label is formed on the upper surface of the upper case in consideration of the former of the problems caused in the conventional art, i.e., the limit in the injection molding. The region at which the label is formed may be a portion or the entirety of the upper surface of the upper case, or the label may be formed or the lower surface of the lower case. Alternatively, labels may be formed on the upper surface of the upper case and the lower surface of the lower case, respectively.

The label may be formed at the upper surface or the lower surface of the battery pack case in various manners. For example, a film-shaped label may be attached to an open upper surface (and/or an open lower surface) of an upper case frame constructed in a structure in which the upper surface of the upper case frame is open (and/or a lower case frame constructed in a structure in which the lower surface of the lower case frame is open). Alternatively, a film-shaped label may be inserted into a mold, and an upper case frame (and/or a lower case frame) may be formed by insert injection molding. According to the present invention, it is preferable to form the label using the insert injection molding.

The material for the film-shaped label is not particularly restricted. For example, the label may be made of a plastic material, such as polycarbonate (PC) or polyethylene terephthalate (PET), or a thin-film metal material. Most preferably, the label is made of the plastic material. The desirable thickness of the label is approximately 0.1 to 0.2 mm in consideration of the thickness of the battery pack and the function of the label as a protective member, although the thickness of the label is not restricted by the above-specified sizes. In consideration of the fact that the thickness limit at the thin-film injection molding is approximately 0.2 mm, however, it should be noted that the present invention enables a battery pack including a case having a very small-thickness upper surface and a very small-thickness lower surface, which cannot be obtained by the thin-film injection molding, to be manufactured.

Based on its external shape, a rectangular or pouch-shaped battery cell may be mounted in the battery pack according to the present invention. Preferably, the battery cell may be a lithium-ion secondary battery or a lithium-ion polymer secondary battery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 12:
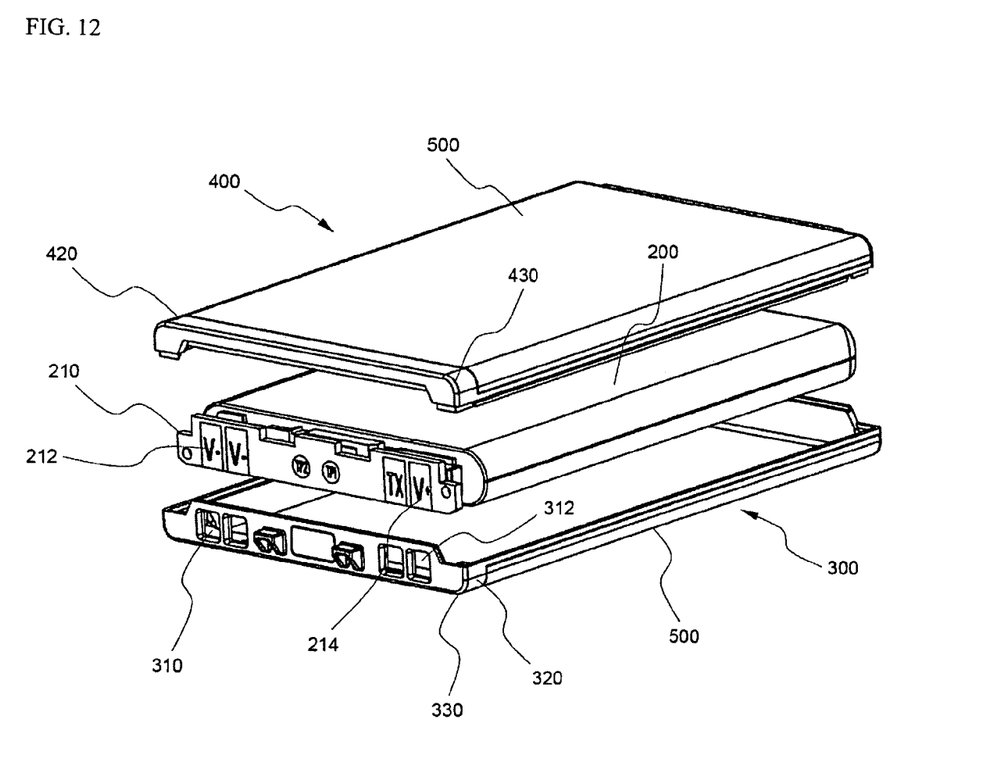
FIG. 12 is an exploded perspective view illustrating a battery pack according to a preferred embodiment of the present invention.
Figure 13:
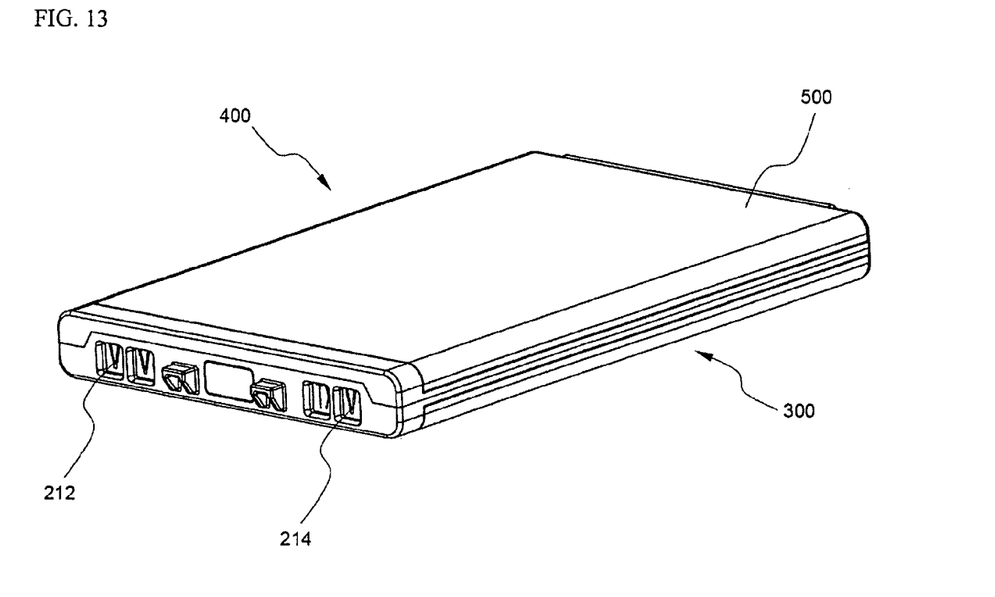
FIG. 13 is an assembled perspective view illustrating the battery pack according to the preferred embodiment of the present invention.

FIG. 12 is an exploded perspective view illustrating a battery pack according to a preferred embodiment of the present invention before the assembly of the battery pack, and FIG. 13 is an assembled perspective view illustrating the battery pack according to the preferred embodiment of the present invention after the assembly of the battery pack.

Referring to these drawings, the battery pack 100 includes a battery cell 200 having an electrode assembly, which consists of cathodes, anodes, and separators, mounted therein together with an electrolyte in a sealed state, a lower case 300 for receiving the battery pack 200, and an upper case 400 coupled to the lower case 300 for sealing the battery cell 200.

To the upper end of the battery cell 200 are mounted protection circuit devices, such as a protection circuit module (PCM) 210 and a positive temperature coefficient (PTC) element.

The lower case 300 has an inner surface corresponding to the outer surface of the battery cell 200 such that the battery cell 200 can be located on the lower case 300. At the upper end of the lower case 300 are formed terminal windows 312 and 314, through which external input and output terminals 212 and 214 of the PCM 210 are exposed.

The lower case 300 and the upper case 400 are constructed generally in similar structures. Specifically, film-shaped labels 500 are formed at the lower surface of the lower case 300 and the upper surface of the upper case 400, and side walls 320 and 420 are formed at the corresponding regions of the lower case 300 and the upper case 400. Also, shoulders 330, at which the lower surface and the side walls 320 meet each other, are gently bent in the sectional shape of a curve. Similarly, shoulders 430, at which the upper surface and the side walls 420 meet each other, are gently bent in the sectional shape of a curve. Consequently, the lower case 300 and the upper case 400 together form an arch-shaped symmetrical structure, and therefore, the lower case 300 and the upper case 400 are structurally stable with respect to an external force applied to the lower case 300 and the upper case 400.

Figure 14:
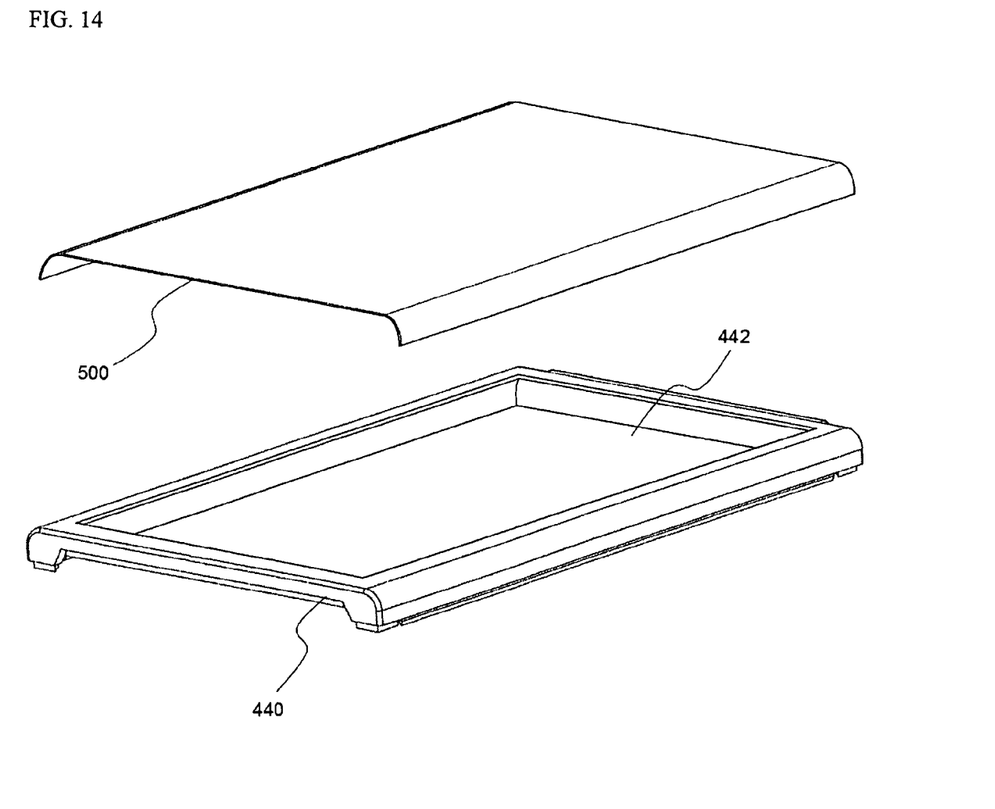
FIG. 14 is a perspective view illustrating a label separated from an upper case of the battery pack according to the preferred embodiment of the present invention.

FIG. 14 is a perspective view typically illustrating the label separated from the upper case of the battery pack shown in FIG. 13.

Referring to FIG. 14, the upper case 400 includes a frame 440, the upper surface of which is wholly opened. The label 500 is applied to the open upper surface of the upper case 400. As previously described, the label 500 may be formed at the open upper surface 442 of the upper case in various manners. As an example, the label 500 is inserted into a predetermined mold (not shown), the interior of which is carved in the same structure as the upper case 400, and molten resin is injected into the mold, whereby the label 500 is integrally fixed to the upper case 400 by insert injection molding.

Figure 15:
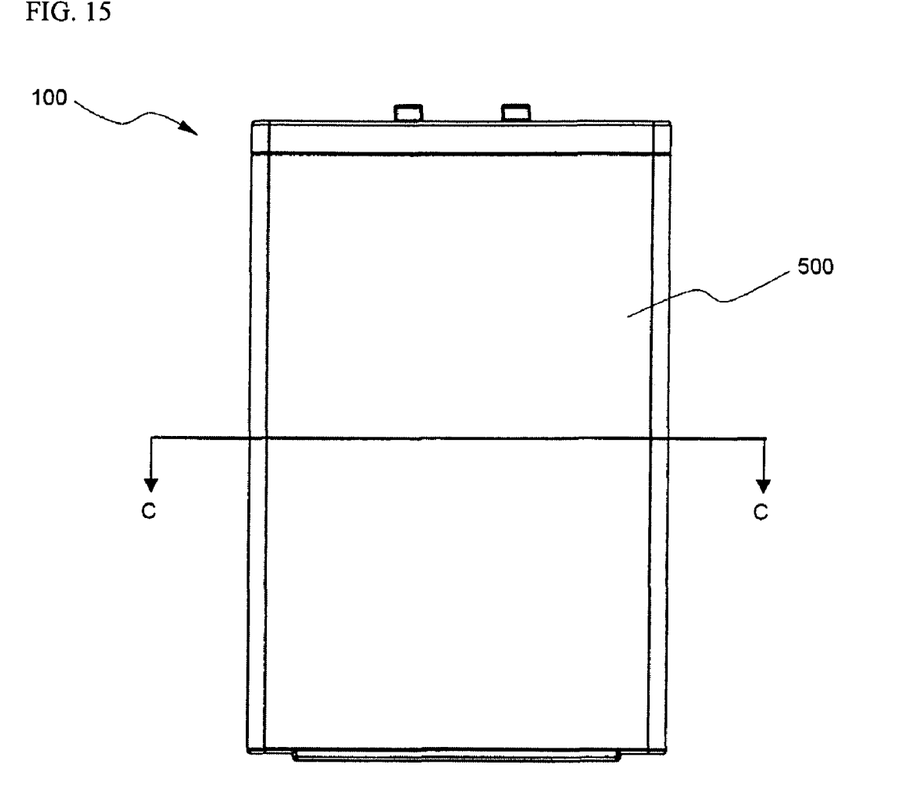
FIG. 15 is a plan view illustrating a battery pack according to a preferred embodiment of the present invention.
Figure 16:
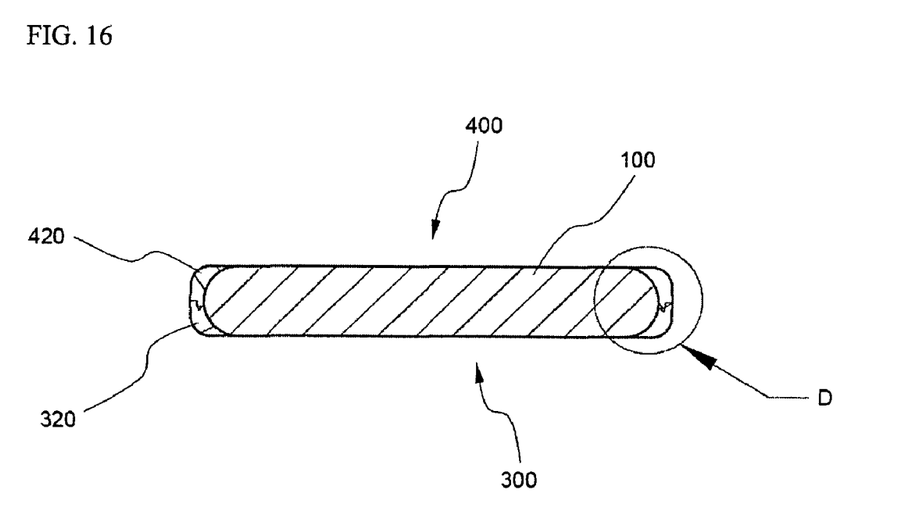
FIG. 16 is a sectional view taken along line C-C of FIG. 15.
Figure 17:
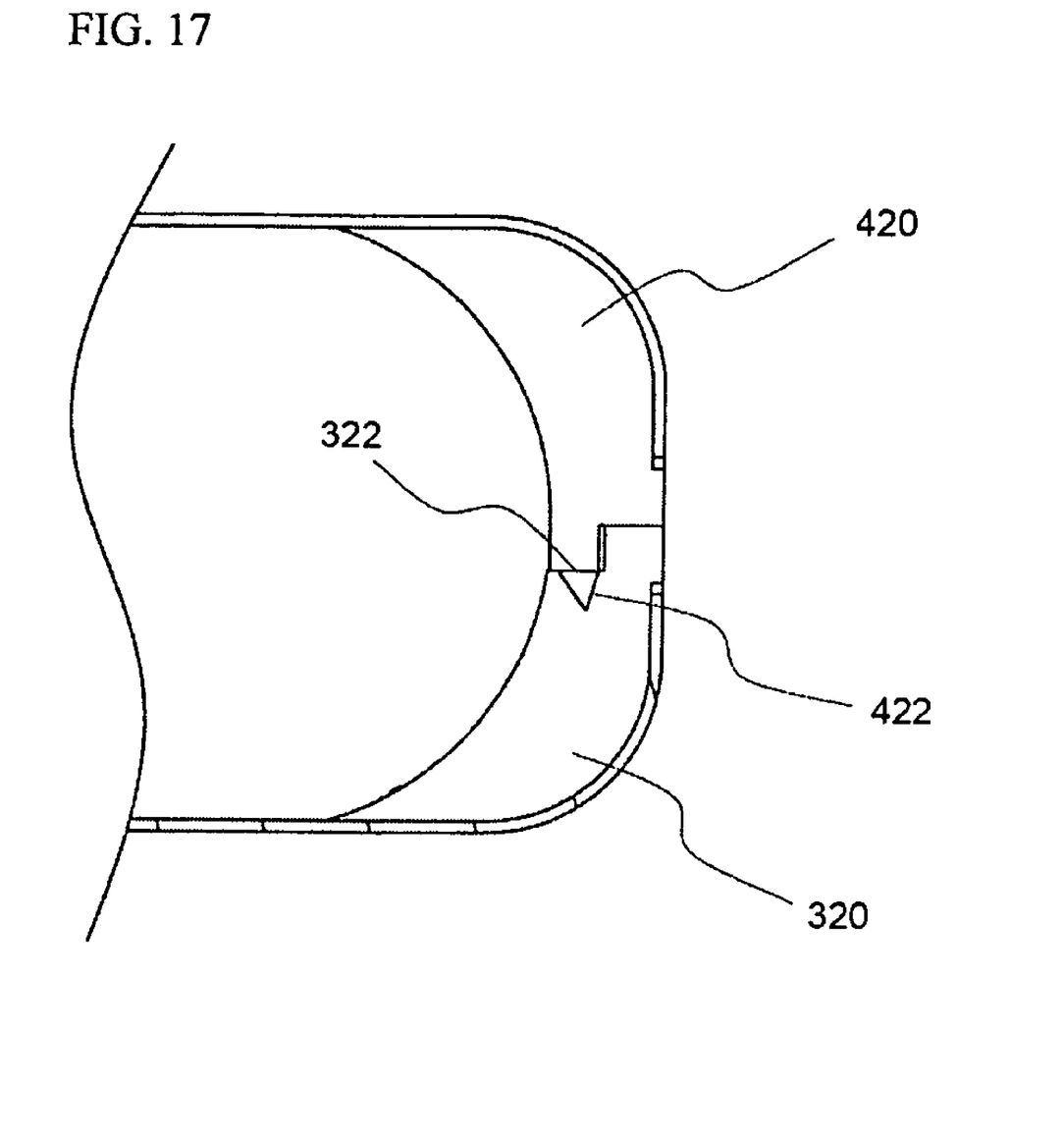
FIG. 17 is a partially enlarged view illustrating the part D of FIG. 16.

FIG. 15 is a plan view illustrating a battery pack according to a preferred embodiment of the present invention, FIG. 16 is a sectional view of the battery pack, and FIG. 17 is a partially enlarged view of the battery pack.

Referring to FIG. 15, the battery pack 100 is constructed generally in a rectangular structure, and the label 500 is formed at the upper surface of the battery pack 100.

Referring to FIG. 16, the side wall 320 of the lower case 300 and the side wall 420 of the upper case 400 have relatively large thickness and interface surface as compared to the conventional battery pack. The battery cell 200 is protected only by the side walls 320 and 420 and the label 500 formed at the upper and lower surfaces of the battery pack 100. Consequently, the thickness of the battery pack 100 is approximately equal to the thickness of the battery cell 200, and therefore, the battery pack 100 is manufactured in a very small-thickness structure.

Referring to FIG. 17, change occurs at the side wall interface of the battery pack during the ultrasonic welding of the battery pack according to the present invention. At the upper end of the lower case side wall 320 is formed a step. At the inside upper end of the lower case side wall 320 is formed a welding surface 322. On the other hand, the lower end of the upper case side wall 420 is constructed in a structure corresponding to the upper end step of the lower case side wall 320. At the inside lower end of the upper case side wall 420 is formed a welding ridge 422. The change occurring during the ultrasonic welding of the battery pack is the same as in FIGS. 10 and 11. As another example, the welding surface may be formed at the upper end of the lower case side wall 320, and the welding ridge may be formed at the lower end of the upper case side wall 420.

The battery pack according to the present invention is preferably used for an inner battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery pack according to the present invention can be manufactured with a smaller thickness. Also, the coupling force due to the ultrasonic welding is very large, the structural stability against drop or external impacts is high, and interface area of the coupling regions is large. Consequently, the attachment of any label for increasing the coupling force and preventing the introduction of foreign matters is not necessary.

What is claimed is:

1. A battery pack comprising:
   one rectangular battery cell comprising an electrode assembly, which consists of cathodes, anodes, and separators, mounted therein together with an electrolyte in a sealed state;
   a lower case comprising an inner space for receiving the battery cell;
   an upper case coupled to the lower case, in which the battery cell is received, for sealing the battery cell,
   wherein at least one, which is selected from an upper surface of the upper case and a bottom surface of the lower case, is wholly opened,
   the upper and lower cases are provided with side walls, each of which has a predetermined thickness, by which coupling regions of the upper and lower cases are located at the sides of the battery cell, and
   a film-shaped label is applied to the open upper surface of the upper case or the open bottom surface of the lower case, a thickness of the film-shaped label is 0.1 to 0.2 millimeters and is less than the predetermined thickness of the side walls of the upper and lower cases, and
   the upper case or the lower case, having the film-shaped label, is manufactured by inserting the film-shaped label into a predetermined mold and forming an upper case frame or a lower case frame using an insert injection molding method.

2. The battery pack according to claim 1, wherein the side walls of the upper case comprise length and thickness approximately equal to the side walls of the lower case, whereby the lower case and the upper case are constructed generally in a symmetrical structure.

3. The battery pack according to claim 1, further comprising:
   shoulders, at which the top portion and the side walls of the upper case meet each other, the shoulders being gently bent in the sectional shape of a curve.

4. The battery pack according to claim 1, further comprising:
shoulders, at which the bottom portion and the side walls of the lower case meet each other, the shoulders being gently bent in the sectional shape of a curve.

5. The battery pack according to claim 1, wherein the side wall regions of the upper and lower cases, at which ultrasonic welding is performed, are made of a plastic material, such as polycarbonate ("PC") or polyacrylonitrile-butadiene-styrene ("ABS").

6. The battery pack according to claim 1, wherein the region at which the label is formed is a portion or the entirety of the upper surface of the upper case or the bottom surface of the lower case.

7. The battery pack according to claim 1, wherein the label is made of a plastic material, such as polycarbonate ("PC") or polyethylene terephthalate ("PET").

8. The battery pack according to claim 1, wherein the battery cell is a lithium-ion secondary battery or a lithium-ion polymer secondary battery.

9. A battery pack comprising:

one rectangular battery cell having an electrode assembly;

a lower case having an inner space configured to receive the battery cell therein;

an upper case coupled to the lower case for holding the battery cell therebetween, the upper case having a film-shaped label and a rectangular ring-shaped frame, the film-shaped label having a sheet portion with two arcuate-shaped side walls disposed on opposite edges of the sheet portion, the two arcuate-shaped side walls extending downwardly from the sheet portion, the film-shaped label being fixedly molded to an upper surface of the rectangular ring-shaped frame such that the sheet portion of the film-shaped label covers an open region of the rectangular ring-shaped frame, a thickness of the film-shaped label is 0.1 to 0.2 millimeters and is less than a thickness of the rectangular ring-shaped frame.

* * * * *